United States Patent [19]

Swenor et al.

[11] Patent Number: 5,516,271

[45] Date of Patent: May 14, 1996

[54] APPARATUS FOR RESIN TRANSFER MOLDING

[75] Inventors: Richard D. Swenor, Enfield; Peter Hryniewicz, Suffield, both of Conn.

[73] Assignee: United Technologies Corporation, Hartford, Conn.

[21] Appl. No.: 168,070

[22] Filed: Dec. 14, 1993

[51] Int. Cl.$^6$ .......................... B29C 45/02; B29C 70/48
[52] U.S. Cl. .................... 425/127; 264/40.7; 264/257; 264/328.4; 264/328.6; 264/328.17; 264/510; 425/144; 425/147; 425/171; 425/129.1; 425/544; 425/586; 425/DIG. 228
[58] Field of Search .................. 425/586, 585, 425/584, 580, 147, 145, 144, 143, 543, 548, 547, 150, 171, 544, DIG. 228, 561, 544, 129.1; 264/510, 511, 571, 546, 257, 255, 328.17, 328.4, 328.5, 328.6, 40.1, 40.7

[56] References Cited

U.S. PATENT DOCUMENTS

| | | |
|---|---|---|
| 2,296,295 | 9/1942 | Shaw . |
| 3,087,201 | 4/1963 | Williams et al. . |
| 3,137,750 | 6/1964 | Gringras . |
| 3,391,425 | 7/1968 | Gardner .................................. 425/544 |
| 3,473,196 | 10/1969 | Hull et al. ............................... 425/544 |
| 3,975,479 | 8/1976 | McLean ................................. 264/257 |
| 4,120,922 | 10/1978 | Lemelson ............................. 264/40.7 |
| 4,222,732 | 9/1980 | Pasch et al. ............................ 425/544 |
| 4,426,341 | 1/1984 | Tsuzuku et al. ..................... 264/328.4 |
| 4,692,291 | 9/1987 | Angell, Jr. ........................... 264/328.6 |
| 4,885,125 | 12/1989 | Kato et al. ........................... 264/328.6 |
| 4,900,485 | 2/1990 | Murakami ............................ 264/328.5 |
| 4,954,301 | 9/1990 | Saeki et al. .......................... 264/328.6 |
| 5,114,637 | 5/1992 | Williams et al. ...................... 264/40.3 |
| 5,116,212 | 5/1992 | Clement-Demange ................. 425/544 |
| 5,125,821 | 6/1992 | Saeki et al. ............................. 425/544 |
| 5,187,001 | 2/1993 | Brew ...................................... 425/145 |
| 5,248,467 | 9/1993 | Cushman ................................ 264/257 |
| 5,433,915 | 7/1995 | Yamamoto et al. ..................... 264/258 |

FOREIGN PATENT DOCUMENTS 2-50813  2/1990  Japan .................................... 425/544

*Primary Examiner*—Jay H. Woo
*Assistant Examiner*—Duane S. Smith
*Attorney, Agent, or Firm*—McCormick, Paulding & Huber

[57] ABSTRACT

In an apparatus for resin transfer molding, the resin is introduced into a heated resin pot, and a piston member is driven through the resin pot to displace the resin into a heated resin line. The temperature of the resin in the resin pot is substantially constant, and is above room temperature but below the catalyzing temperature of the resin. The preheated resin flows from the resin line into a preheater, which heats the resin to molding temperature and catalyzes the resin, and the catalyzed resin is then introduced into the mold cavity of a resin transfer mold containing a structural preform. The resin is maintained at a substantially constant pressure within the heated resin line, and the movement of the piston member is continuously monitored during the resin transfer process. The resin transfer process is terminated when the rate of movement of the piston member decreases below a predetermined minimum value approaching zero.

14 Claims, 3 Drawing Sheets

APPARATUS FOR RESIN TRANSFER MOLDING

FIELD OF THE INVENTION

The present invention relates to apparatus and methods for molding, and more particularly, to apparatus and methods for resin transfer molding.

CROSS REFERENCE TO RELATED APPLICATION

The subject matter of this specification is related to the subject matter of co-pending patent application, entitled "Automated Apparatus and Method for Resin Transfer Molding", Ser. No. 08/166,724, filed on even date herewith, which is hereby expressly incorporated by reference as part of the present disclosure.

BACKGROUND OF THE INVENTION

In a typical resin transfer molding process, a fiber preform of the article to be manufactured is placed within a mold cavity defined by a steel mold, and a liquid resin is injected into the mold cavity. The resin is absorbed by the fiber preform, and then cured to form the article of manufacture. Typical fibers used to make fiber preforms include fiberglass, graphite, carbon and aromatic polyamide fibers such as are sold under the name Kevlar, and the fibers are often braided or woven into a sheet form. The resins are typically epoxy resins, although other types of resins, such as polyester resins, are also employed.

In FIG. 1, a typical prior art system 2 for resin transfer molding is illustrated, which includes a steel mold 4 defining a mold cavity 5, a pressure pot 6 coupled to an injection port of the mold 4, a collection pot 7 coupled through a resin vent to the mold cavity, and a vacuum pump 8 coupled through the collection pot 7 to the resin vent and mold cavity 5. A structural preform (not shown) is placed within the mold cavity 5, which is formed at least in part by woven or braided fibers. The pressure pot 6 is filled with resin and heated to mold temperature, and a vacuum is drawn on the mold cavity 5 by the vacuum pump 8. Pressurized air is then introduced into the top of the pressure pot 6, which forces heated resin into the line coupled between the pressure pot 6 and the injection port, and in turn into the mold cavity 5. As the pressurized, heated resin is introduced into the mold cavity 5, it is absorbed by the fiber preform.

At selected time intervals after introduction of the heated resin into the mold cavity 5, an operator opens the line coupled to the resin vent and bleeds resin from the mold cavity 5 into the collection pot 7. As illustrated in FIG. 1, the collection pot 7 includes a sight glass 9 to enable the operator to view the released resin. If there are air bubbles within the resin, then the operator should know based on experience and skill that the mold cavity is not yet full (and that the fiber preform is not fully saturated with resin). The operator then closes the resin vent, pressurizes the pressure pot 6 to a predetermined pressure again, and introduces more pressurized resin into the mold cavity 5. This inspection process is repeated at spaced intervals in time until the operator determines based on experience and skill that the mold cavity 5 is purged of air, and is filled so that the fiber preform has fully absorbed the resin.

Each resin bleeding and inspection step is relatively time consuming, primarily because after the operator bleeds resin into the collection pot 7, the pressure pot 6 must be pressurized again. This bleeding and inspection step is typically repeated at least three or four times for each article that is molded, making the resin transfer molding process time consuming and relatively expensive. In addition, resin is wasted each time the operator is required to bleed the resin into the collection pot 6 to inspect the resin. Because this occurs several times during the molding of each article, the volume of wasted resin and corresponding wasted costs can be substantial.

Another drawback of such prior systems is that they rely on operator judgment to determine when the mold cavity is filled with resin. This typically results in poor repeatability, and lower overall quality of the products being produced. If the operator prematurely terminates the resin transfer molding process, the molded part will typically have voids caused by an insufficient absorption of resin by the structural preform, which usually renders the part not usable. This is particularly the case in the aerospace industry, wherein voids in aircraft components, for example, cannot be tolerated.

It is an object of the present invention to overcome the drawbacks and disadvantages of such prior art apparatus and methods for resin transfer molding.

SUMMARY OF THE INVENTION

According to the present invention, an apparatus for resin transfer molding comprises a resin container defining a resin chamber for receiving resin, and an outlet port coupled in fluid communication with the resin chamber for releasing resin from the resin chamber. A piston member is received within the resin chamber for directing resin through the outlet port, upon movement of the piston member through the resin chamber. The apparatus further comprises a mold defining a mold cavity for receiving a structural preform and resin. The mold cavity is coupled in fluid communication with the outlet port of the resin container for receiving the resin directed through the outlet port by the piston member.

According to another aspect of the present invention, an apparatus of the foregoing type further comprises a position sensor mounted adjacent to the piston member, which includes means for generating signals indicative of movement of the piston member.

According to another aspect of the present invention, an apparatus of the foregoing type further comprises a drive cylinder coupled to the piston member for driving the piston member through the resin chamber. The drive cylinder includes means for maintaining a substantially constant pressure within the drive cylinder, to in turn maintain the pressure of resin flowing between the resin chamber and mold cavity at a predetermined substantially constant level.

According to another aspect of the present invention, an apparatus further comprises heating elements for heating the resin container, and maintaining the resin within the resin container at a substantially constant temperature below the resin molding temperature. Preferably, the apparatus of the present invention further comprises a resin line coupled in fluid communication between the outlet port of the resin container and the mold cavity, and including at least one heating element for preheating the resin while flowing through the resin line.

According to another aspect of the present invention, an apparatus further comprises a heating unit coupled in fluid communication between the resin container and the mold cavity, and including at least one heating element for heating the resin to at least the resin molding temperature prior to passage of the resin into the mold cavity. A vacuum pump is preferably coupled to the mold cavity for reducing the pressure of the mold cavity prior to introduction of the heated resin into the mold cavity.

Another aspect of the present invention is directed to a method of resin transfer molding an article, comprising the following steps: introducing resin into a resin chamber and driving a piston member through the resin chamber to displace resin through an outlet port of the resin chamber; directing the flow of resin through the outlet port of the resin chamber into a mold cavity defined by a resin transfer mold; measuring the movement of the piston member through the resin chamber; and terminating the flow of resin from the resin chamber into the mold cavity in response to the rate of movement of the piston member falling below a predetermined minimum value.

According to another aspect of the present invention, a method of the foregoing type further comprises the step of controlling the movement of the piston member through the resin chamber to maintain the pressure of the resin flowing between the resin chamber and mold cavity within a predetermined pressure range.

One advantage of the apparatus and method of the present invention, is that they do not rely on operator judgement to determine when the mold cavity is filled with resin, i.e., when the structural preform is substantially fully saturated, as with prior art resin transfer molding apparatus and methods. Preferably, the resin line pressure is maintained within a substantially predetermined range, and is therefore maintained at a substantially constant level. Accordingly, when the rate of piston movement becomes negligible (or approaches zero), then it is clear that the preform is no longer absorbing resin, but rather has become saturated, and the resin transfer process is terminated. Accordingly, there is no need to bleed the resin from the cavity to determine, based on experience and skill, whether the mold cavity is full, as with prior art methods and apparatus. Repeatability and quality control is therefore substantially enhanced with the apparatus and method of the present invention.

Other advantages of the apparatus and method of the present invention will become apparent in view of the following detailed description and accompanying drawings.

DETAILED DESCRIPTION OF THE PREFERRED EMBODIMENTS

Figure 2:
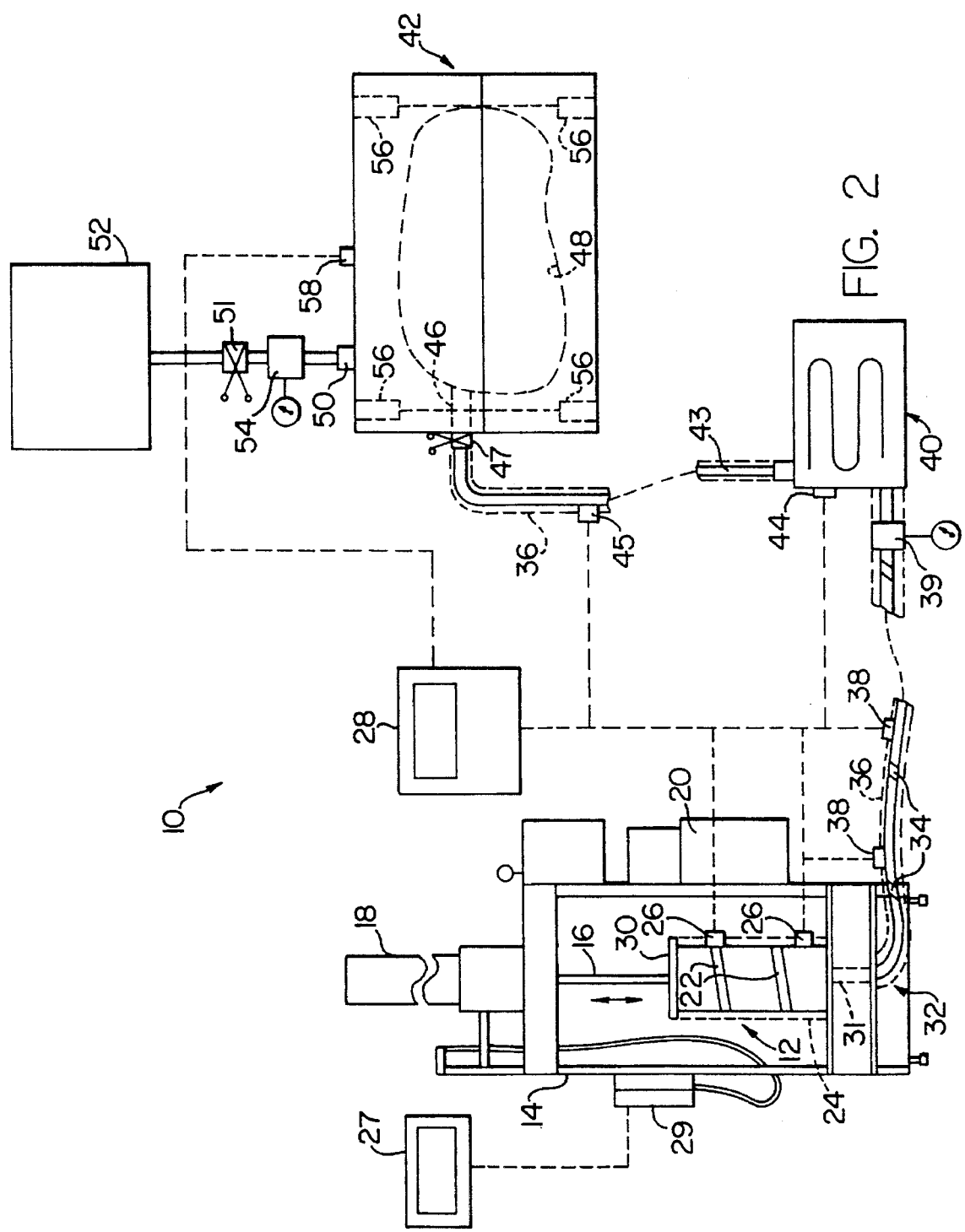
FIG. 2 is a schematic illustration of an apparatus for resin transfer molding embodying the present invention.

In FIG. 2, an apparatus embodying the present invention for resin transfer molding is indicated generally by the reference numeral 10. The apparatus 10 comprises a heated resin pot 12 mounted within a frame 14. The heated resin pot 12 defines a substantially cylindrical bore extending through the resin pot, and one end of a piston 16 is received within the cylindrical bore. The other end of the piston 16 is coupled to a hydraulic cylinder 18 mounted on top of the frame 12, which is in turn coupled to a hydraulic pump 20 to drive the piston 16 within the bore of the resin pot 12. The hydraulic pressure of the cylinder 18 is set to maintain the resin flowing from the resin pot at a substantially constant predetermined pressure, or within a predetermined pressure range, as is described further below.

The resin pot 12 is heated by several electric heating elements 22, and a layer of insulating material 24 is wrapped over the heating elements 22 to thermally insulate the heated resin pot, as illustrated by dashed lines in FIG. 2. Several thermocouples 26 are mounted on the resin pot 12 to measure the temperature of the resin pot, and each thermocouple is connected to a recording unit 28 for recording the temperature readings of the thermocouples. In the embodiment of the present invention illustrated, the recording unit 28 is a chart recorder, although it is noted that numerous types of recording units may equally be employed, which may, for example, record the temperature readings electronically, and store them in a database. The heating elements 22 are of a type known to those skilled in the art, and can be set to maintain the resin pot 12 at a substantially constant temperature or within a predetermined temperature range.

A position sensor 29 is mounted on the frame 14 adjacent to the piston 16 to measure the stroke of the piston. The position sensor 29 is of a type known to those skilled in the pertinent art, and although numerous types of position sensors may equally be employed in the apparatus of the present invention, the particular unit employed in the embodiment of the present invention illustrated is a Sony "Magnascale", model no. NA31-F. The position sensor 29 monitors the position of the piston 16, and the rate of piston movement, and transmits signals to a flow recording unit 27 indicative thereof. In the embodiment of the present invention illustrated, the flow recording unit 27 is a chart recorder, which records in graphical format the piston travel vs. time throughout the resin transfer process, as is described further below. It is noted, however, that other types of recording units may equally be employed, such as recording units which store the signals transmitted by the position sensor 29 electronically and visually display the data on a monitor.

The resin pot 12 defines an inlet port 30 on one end for filling the resin pot with resin, and for receiving the piston 16, as shown in FIG. 2. An outlet port 31 is defined on the opposite end of the resin pot relative to the inlet port 30, and is coupled to a heated resin line 32 for introducing the resin into the resin line in response to the downward stroke of the piston 16, as is described further below. The resin line 32 includes several electric heating elements 34 for heating the line, and a layer of insulating material 36 is wrapped over the heating elements and the resin line to thermally insulate the heated resin line. Several thermocouples 38 are also mounted to the resin line to monitor the temperature of the resin line. The thermocouples 38 are each coupled to the temperature recording unit 28, to record the resin line temperature, and the heating elements 34 are set to maintain a substantially constant predetermined temperature of the resin line 32. A pressure sensor 39 is coupled to the resin line 32 to measure the pressure of the resin flowing through the line, which is maintained at a substantially constant level by setting and controlling the hydraulic pressure of the cylinder 18.

The other end of the heated resin line 32 is coupled to a preheater 40 for preheating the resin to mold temperature prior to introduction into the mold cavity of a mold 42. The preheater 40 is of a type known to those skilled in the pertinent art, and includes several heating elements (not shown) for heating the resin to mold temperature upon passage through the preheater 40. Several thermocouples, shown typically at 44, are mounted to the preheater 40, and are in turn coupled to the temperature recording unit 28 to monitor and record the temperature of the preheater. The heating elements of the preheater 40 are set to maintain the resin discharged from the preheater at a substantially constant predetermined temperature or within a predetermined temperature range.

Another heated resin line 43 wrapped in insulating material 36, as indicated by dashed lines in FIG. 2, is coupled in fluid communication between the preheater 40 and an inlet port 46 of the mold 42 to introduce heated resin into the mold cavity 48. Thermocouples, shown typically at 45, are mounted on the heated resin line 43 and coupled to the temperature recording unit 28, to monitor and record the temperature of the resin line. The heating elements (not shown) of the resin line 43, are set to maintain the resin flowing through the line at a substantially constant predetermined temperature or within a predetermined temperature range.

An inlet valve member 47 is coupled between the resin line 43 and the inlet port 46 for controlling the flow of resin through the inlet port and into the mold cavity. In the embodiment of the present invention illustrated, the inlet valve member 47 is a mechanical clamp which closes or opens the line by actuating the clamp. It is noted, however, that numerous other types of clamping or valve mechanisms may equally be employed to control the flow of resin through the resin line 43. The mold 42 is a two-piece mold defining a mold cavity 48, illustrated in dashed lines in FIG. 2, which is coupled in fluid communication with the inlet port 46 to receive the heated resin flowing through the inlet port.

A vacuum port 50 is also coupled in fluid communication with the mold cavity 48, and is coupled through a valve member 51 to a vacuum pump 52 for pulling a vacuum on the mold cavity prior to introduction of the heated resin into the mold. In the embodiment of the present invention illustrated, the valve member 51 is also a mechanical clamp, which opens or closes the line by actuating the clamp. A pressure sensor 54 is coupled to the vacuum line extending between the mold cavity and the vacuum pump to measure the pressure within the vacuum line and mold cavity.

The mold 42 also includes heating elements 56 for heating the walls defining the mold cavity, and thermocouples, shown typically at 58, for monitoring the temperature of the mold. The thermocouples 58 are coupled to the temperature recording unit 28, to measure and record the temperature of the mold, and the heating elements 56 are set to maintain the temperature of the mold cavity at a substantially constant temperature or within a predetermined temperature range.

In the operation of this apparatus, and in accordance with a method of the present invention, a predetermined quantity of liquid resin is introduced into the resin pot 12, and the piston 16 is inserted through the inlet port 30 of the resin pot to pump the resin. The heating elements 22 are activated to heat the resin within the resin pot 12 to an initial working temperature and to substantially maintain the resin at that temperature, primarily for purposes of maintaining consistent operating conditions from one molded article to the next. The initial working temperature is higher than room temperature, but below the molding temperature of the resin, i.e., below the threshold temperature for catalyzing the resin. In the embodiment of the present invention illustrated, the initial working temperature of the resin is preferably within the range of approximately 120° to 150° F. The heated resin line 32 is preferably heated to a temperature above the initial working temperature, for example, approximately 250° F.

A structural preform (not shown) is placed within the mold cavity 48, the two halves of the mold 42 are coupled together to seal the mold cavity, the inlet valve member 47 is closed, and the vacuum pump 52 is activated to pull a vacuum (i.e., create a negative pressure) on the mold cavity through the vacuum port 50. The heating elements 56 of the mold 42 are also activated to raise the temperature of the mold cavity to the correct molding temperature as indicated by the thermocouples 58.

Once the resin pot 12 and resin line 32 are each preheated to their respective predetermined temperatures, as measured by the thermocouples 26 and 38, the hydraulic pump 20 and hydraulic cylinder 18 are actuated to drive the piston 16 downward in FIG. 2, and in turn displace the liquid resin at the initial working temperature through the resin line 32 and into the preheater 40. The liquid resin is then passed through the preheater 40, and heated to molding temperature, i.e., above the threshold temperature necessary to catalyze the resin. In the embodiment of the present invention illustrated, the preheater heats the resin to a temperature within the range of approximately 300° to 320° F. to catalyze the resin. The heated resin line 43 is also heated to approximately the same temperature as the preheater 40. Once the resin within the preheater 40 and heated resin line reaches the molding temperature, and a predetermined vacuum pressure is achieved within the mold cavity 48, the inlet valve member 47 is opened, and the heated resin is permitted to flow from the preheater 40 into the inlet port 46 of the mold, and in turn into the mold cavity.

When the liquid resin flows through the mold cavity 48, vacuum port 50, and into the vacuum line, the valve member 51 is closed to cut off the vacuum pump from the mold. The hydraulic pressure of the cylinder 18 is set to maintain the resin within the resin line 32 and preheater 40 at a substantially constant pressure or within a predetermined pressure range. In the embodiment of the present invention illustrated, the preferred resin line pressure is approximately 50 psi. However, this resin pressure is only exemplary, and may be increased or decreased, depending upon the requirements of a particular system and the article to be molded. The greater the resin pressure, typically the faster is the molding process, i.e., the faster is the rate at which the resin is absorbed by the structural preform. However, if the resin pressure is too great, it may damage the structural preform, and thereby destroy the article being molded.

A preferred method of selecting the appropriate resin line pressure for a particular type of article to be molded, is to select an initial pressure level based on the expected absorption rate of the structural preform, and the safety limits of the system. Then, an article is molded at the selected pressure level, and the flow rate of the resin during the molding process is measured, i.e., the time required to fill the mold cavity and saturate the structural preform with resin. The resin line pressure is then increased by a predetermined pressure interval (e.g., 10 psi), another article is molded, and the flow rate is measured. If the flow rate appreciably increases, the procedure is repeated again. If the flow rate does not appreciably increase, then the selected resin line pressure is appropriate. The hydraulic pressure of the hydraulic cylinder 18 is set to correspond to the selected resin line pressure, and is maintained at the selected level to ensure that the resin line pressure is maintained at a substantially constant level throughout the resin transfer process. The resin line pressure can be monitored based on the readings of the pressure sensor 39.

During the resin transfer process, the position sensor 29 continuously monitors the displacement of the piston 16, and transmits signals indicative of the rate of piston movement to the flow recording unit 27. Based on these signals, the flow recording unit 27 plots the displacement of the piston 16 vs. time during the resin transfer molding process. This plot is indicative of the flow rate of resin between the resin pot 12 and mold cavity 48 during the resin transfer process, and based on the known volume of the resin pot, this data can be directly converted to flow rate values. This information can be critical for quality control, particularly for aircraft components.

When the resin line pressure is maintained within the predetermined range, and the rate of movement of the piston 16 approaches zero or becomes negligible, then the structural preform is substantially saturated with resin, and the resin transfer process may be terminated. Accordingly, when the rate of movement of the piston 16 falls below a predetermined minimum level as measured by the position sensor 29 (i.e., when the rate equals or approaches zero), the resin transfer process is terminated by closing the valve member 47, and turning off the hydraulic pump 20 and hydraulic cylinder 18. For example, if the position sensor 29 indicates that the piston 16 does not move within a predetermined time frame, such as one minute, then the resin transfer process is terminated. The molded article is then thermally cured within the mold cavity 48 for a predetermined period of time prior to removal from the mold (e.g., 300° F. for 2 hours).

One advantage of the above-described apparatus and method of the present invention, is that the system does not rely on operator judgment to determine when the mold cavity is filled with resin, i.e., when the structural preform is substantially fully saturated, as with prior art resin transfer molding apparatus and methods. Because the resin line pressure is maintained at a substantially constant level, when the rate of piston movement becomes negligible (or approaches zero), it is clear that the preform is substantially saturated and the resin transfer process can be terminated. Accordingly, there is no need to bleed the resin from the cavity to determine, based on experience and skill, whether the mold cavity is full, as with prior art methods and apparatus. Repeatability and quality control is therefore substantially enhanced with the present invention. Similarly, the downtime and resin waste normally associated with prior systems in which it was necessary to inspect the resin to determine if the mold cavity is full, is eliminated with the present invention.

Another advantage of the present invention, is that the resin is not heated to mold temperature until it enters the preheater 40. Accordingly, substantially all of the resin that is catalyzed by the preheater 40 is used in molding each article. Because the remainder of the resin located in the resin pot 12 is not catalyzed, it can be used to mold the next article, and is not wasted.

Another advantage of the present invention, is that because the resin is preheated in the resin pot to an initial working temperature, which is above room temperature but below the catalyzing temperature of the resin, the viscosity of the resin is reduced, thus rendering the resin easier to inject through the outlet port of the resin pot and through the resin line.

Yet another advantage of the present inventions is that the readings of the position sensor, which are indicative of piston movement, can be converted to resin flow rate. A reduction in the normal flow rate for a particular article being molded indicates a restricted area in the preform or laid-up assembly. This may be indicative of a defect in the article, and thus is a valuable tool in ensuring quality control.

Figure 1:
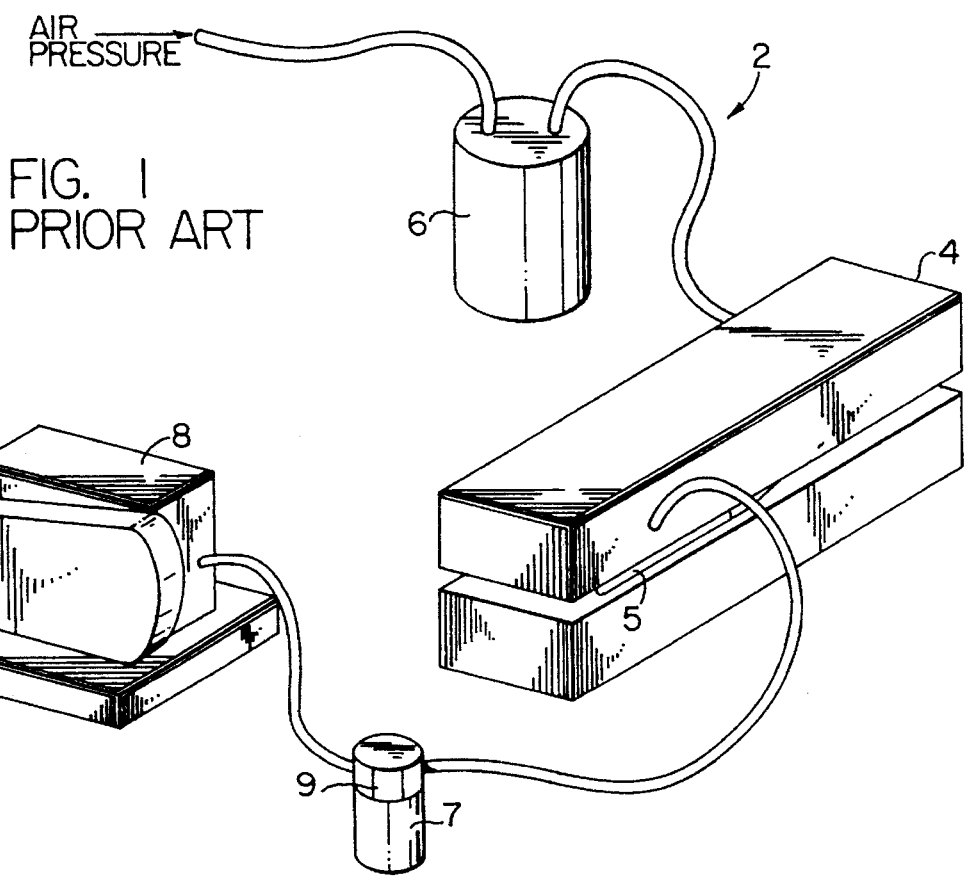
FIG. 1 is a schematic illustration of a prior art system for resin transfer molding.
Figure 3:
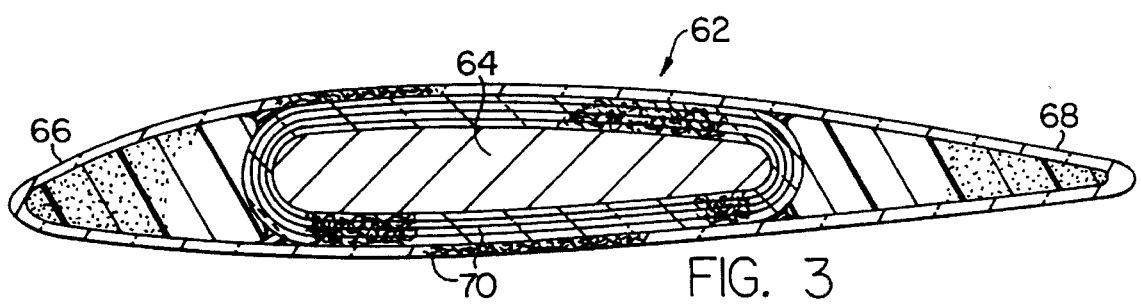
FIG. 3 is a cross-sectional view of an airfoil in the form of a propeller or turbine blade manufactured in accordance with a method of the present invention.

Accordingly, the above-described method and apparatus of the present invention can be used to efficiently, and relatively rapidly mold complicated articles by resin transfer. An exemplary article molded in accordance with the present invention is illustrated in FIG. 3, and indicated generally by the reference numeral 62. As can be seen, the article 62 is an air foil in the form of a propeller or turbine blade, in which the spar 64 is formed of aluminum, and the leading edge portion 66 and trailing edge portion 68 on either side of the spar 64 are each formed by a closed cell foam, such as a low density, polyurethane foam. Woven or braided fibers 70 in sheet form are wrapped around the spar and closed cell foam, which absorb the resin during the resin transfer process. As will be recognized by those skilled in the art, numerous modifications can be made to such molded articles employing the present invention. For example, the spar 64 can likewise be made of a closed cell foam, and can be individually wrapped in sheets of woven and/or braided fibers. A composite shell is then formed around the entire blade by wrapping additional layers of fibrous materials around the blade.

Figure 4:
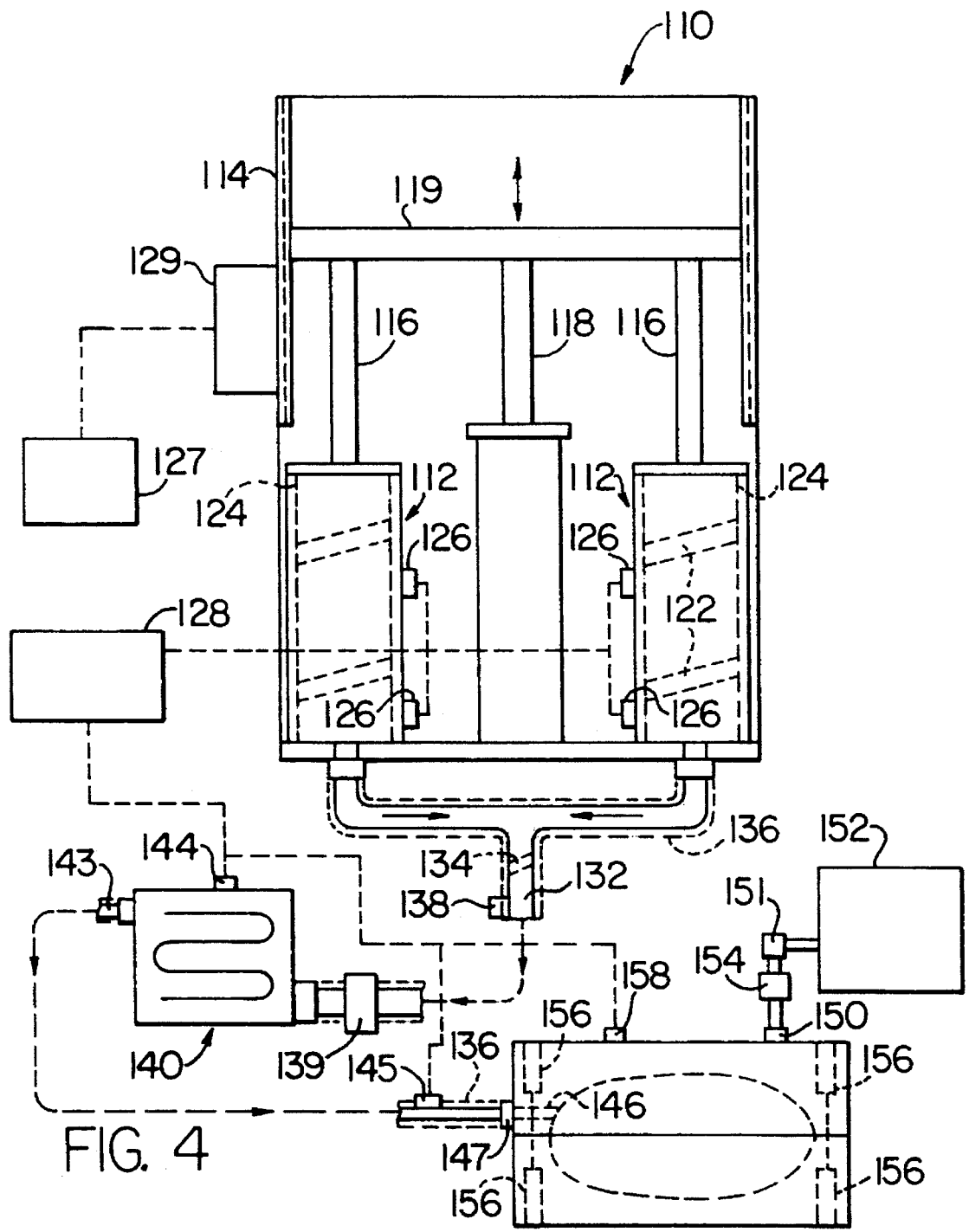
FIG. 4 is a schematic illustration of another embodiment of an apparatus of the present invention for resin transfer molding.

Turning to FIG. 4, another embodiment of an apparatus of the present invention for resin transfer molding is illustrated, and is indicated generally by the reference numeral 110. The apparatus 110 is similar in many respects to the apparatus 10 described above in connection with FIG. 2, and therefore like reference numerals preceded by the numeral 1 are used to indicate like elements.

The apparatus 110 differs from the apparatus 10 described above essentially in that the apparatus 110 includes two heated resin pots 112 which both feed into a common heated resin line 132. The hydraulic cylinder 118 is mounted on the base of the frame 114 between the two resin pots 112, and is coupled to a drive bar 119, which is in turn coupled to the end of each piston 116. Actuation of the hydraulic cylinder 118 downward in FIG. 4, simultaneously drives the two pistons 116 in the same direction, and in turn simultaneously displaces the resin from the two resin pots into the common heated resin line 132, and in turn into a preheater 140.

One advantage of this embodiment of the present invention, is that the hydraulic cylinder is mounted on the base of the frame, thereby reducing the vertical profile of the apparatus in comparison to the apparatus of FIG. 2. Another advantage of this embodiment of the present invention, is that because the apparatus includes two resin pots, it can be operated continuously without refill for a longer period of time in comparison to the apparatus of FIG. 2.

As will be recognized by those skilled in the art, numerous modifications may be made to the above-described apparatus and method of the present invention without departing from the scope of the invention as defined in the appended claims. For example, it may be desirable to employ several resin pots with several associated hydraulic cylinders to feed one or more molds. It may also be desirable to heat the resin to a different temperature than described above, or to catalyze the resin at a different stage of the process than described above.

What is claimed is:

1. An apparatus for resin transfer molding, comprising:

a resin container defining a resin chamber for receiving resin and an outlet port coupled in fluid communication with the resin chamber for releasing resin from the resin chamber;

a piston member received within the resin chamber for directing resin through the outlet port upon movement of the piston member through the resin chamber;

a mold defining a mold cavity for receiving a structural preform and resin, the mold cavity being coupled in fluid communication with the outlet port of the resin container for receiving the resin directed through the outlet port by the piston member; and means for monitoring the rate of piston movement as the piston moves through the resin chamber and terminating resin transfer in response to the rate of piston movement equaling or falling below a predetermined minimum value for filling the mold cavity with resin.

2. An apparatus as defined in claim 1, wherein the means for monitoring piston movement and terminating resin transfer includes a position sensor mounted adjacent to the piston member, the position sensor including means for generating signals indicative of movement of the piston member.

3. An apparatus as defined in claim 1, further comprising a drive cylinder coupled to the piston member for driving the piston member through the resin chamber.

4. An apparatus as defined in claim 3, wherein the drive cylinder includes means for maintaining a substantially constant pressure within the drive cylinder to in turn maintain the pressure of resin flowing between the resin chamber and mold cavity at a substantially constant, predetermined pressure for filling the mold cavity with resin.

5. An apparatus as defined in claim 1, further comprising a drive unit coupled to the piston member to drive the piston member through the resin chamber, and including means for applying a substantially constant force to the piston member to in turn maintain the pressure of resin flowing between the resin chamber and mold cavity at a substantially constant, predetermined level for filling the mold cavity with resin.

6. An apparatus as defined in claim 1, further comprising means for heating the resin container and maintaining the resin within the resin container at a substantially constant temperature above room temperature and below the resin molding temperature.

7. An apparatus as defined in claim 1, further comprising a resin line coupled in fluid communication between the outlet port of the resin container and the mold cavity, and including means for heating the resin while flowing through the resin line.

8. An apparatus as defined in claim 7, further comprising means for maintaining the resin flowing through the resin line at a substantially constant temperature below the resin molding temperature.

9. An apparatus as defined in claim 1, further comprising a heating unit coupled in fluid communication between the resin container and the mold cavity, and including at least one heating element for heating the resin to at least the resin molding temperature prior to passage of the resin into the mold cavity.

10. An apparatus as defined in claim 1, further comprising a vacuum pump coupled to the mold cavity for creating a negative pressure in the mold cavity.

11. An apparatus as defined in claim 1, comprising two resin containers; two piston members, each piston member being received within a respective resin container; and a drive member coupled to both piston members for substantially simultaneously driving both piston members.

12. An apparatus as defined in claim 11, further comprising a hydraulic cylinder coupled to the drive member for driving the drive member and two piston members; and including means for maintaining the hydraulic pressure of the hydraulic cylinder at a predetermined substantially constant level to in turn maintain the pressure of resin flowing between the resin chamber and mold cavity at a predetermined substantially constant level for filling the mold cavity with resin.

13. An apparatus as defined in claim 2, wherein the means for monitoring piston movement and terminating resin transfer further comprises a recording unit coupled to the position sensor, and responsive to the signals transmitted by the position sensor to record movement of the piston member.

14. An apparatus as defined in claim 1, further comprising:

means for maintaining the resin flowing between the resin container and the mold cavity within a predetermined pressure range for filling the mold cavity with resin.

* * * * *